United States Patent [19]
Robertson et al.

[11] 3,951,680

[45] Apr. 20, 1976

[54] FILLED POLYOLEFIN COMPOSITIONS

[75] Inventors: James A. Robertson, West Chester, Pa.; Robert L. Adelman; Horacio Enrique Bergna, both of Wilmington, Del.

[73] Assignee: E. I. Du Pont de Nemours and Company, Wilmington, Del.

[22] Filed: May 28, 1974

[21] Appl. No.: 473,663

Related U.S. Application Data

[62] Division of Ser. No. 356,431, May 2, 1973, abandoned.

[52] U.S. Cl. ............................ 106/302; 106/308 N; 106/291; 106/306; 428/363

[51] Int. Cl.² ........................ C09C 1/00; C09C 1/42

[58] Field of Search ............ 106/302, 308 Q, 288 B, 106/291, 308 N; 260/438.5 C

[56] References Cited
UNITED STATES PATENTS

| | | | |
|---|---|---|---|
| 3,442,851 | 5/1969 | McManimie | 260/41 |
| 3,775,455 | 11/1973 | Cumbo | 260/438.5 C |

*Primary Examiner*—Winston A. Douglas
*Assistant Examiner*—J. V. Howard

[57] ABSTRACT

Filled polyolefin compositions having silicate mineral fillers coupled into the resin by means of certain coordination complexes, particularly fumarato chromium nitrate. Polyethylene or polypropylene resins with talc or kaolin fillers are preferred. Processes are also provided.

7 Claims, No Drawings

FILLED POLYOLEFIN COMPOSITIONS

This application is a division of our copending application Ser. No. 356,431, filed May 2, 1973, now abandoned.

BACKGROUND OF THE INVENTION

This invention relates to filled polyolefin compositions and processes for their preparation. More particularly, it relates to such compositions having certain coupling agents coupling the filler into the resin.

It is well known that mineral fillers can be coupled into various plastic resins by means of such agents as vinyl silanes. Also, certain chromium complexes are known in the art to be useful as coupling agents for fiberglass in resins.

Belgian Pat. No. 765,137, granted Oct. 1, 1971 and U.S. Pat. No. 3,787,326-Deyrup, granted Jan. 22, 1974, describe the use of various chromium complexes for adhering to plastics metal oxide substrates such as aluminum oxide ceramics, titanium oxide materials, and glass, with the substrate being in any desired physical form such as in the form of foils, sheets, rods and the like, or in particulate, wire or fiber forms commonly employed for reinforcing plastic objects. However, there is no recognition in the Belgian patent of the general utility of the complexes for coupling commercially used mineral silicate fillers into polyolefin resins.

Fillers are used in polyolefin resins for a variety of purposes. One frequent use is as an extender, replacing, volume for volume, relatively more expensive polyethylene or polypropylene with relatively less expensive talc or clay. Certain properties such as stiffness and heat distortion temperature may be improved by the untreated filler. However, as might be expected, such uses do frequently impair other mechanical properties of the filled composition. Coupling agents are used to diminish the loss of mechanical properties relative to the unfilled plastics. Certain commercial coupling agents such as silanes do improve mechanical properties relative to the uncoupled, filled material but do not give as good mechanical properties as might be desired, including tensile strength, flex modulus, and heat distortion characteristics.

SUMMARY OF THE INVENTION

The present invention, in certain of its embodiments, provides a mineral-filled polyolefin resin polymeric material of aliphatic olefins having from 2 to 8 carbon atoms, the filler being a particulate silicate mineral, and the filler being coupled into the resin by means of a coupling agent comprising one or more water-soluble coordination complexes of (a) chromium (III) derived from a water-soluble salt thereof with a noncoordinated anion, which salt yields $Cr(H_2O)_6^{3+}$ in water; with (b) a trans-acid of the formula

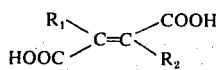

wherein $R_1$ and $R_2$ are the same or different and are H, alkyl, $-CH_2COOH$ or phenyl; provided that the total number of carbon atoms in said trans-acid in an integer in the range 4–10, inclusive.

Preferred polyolefins are polyethylene and polypropylene, and preferred silicate mineral fillers are talc, kaolin, calcined kaolin, wollastonite, mica, attapulgite, asbestos, and montmorillonite.

Preferred coupling agent compostions are Type I having an approximate ratio of chromium (III) and acid to noncoordinated anion of 1/1/2 and an approximate formula of

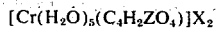

and Type III having such a ratio of 2/1/4 and an approximate formula of

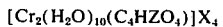

wherein:
Z is H or $CH_3$, and
X is a noncoordinated anion.

The most preferred coupling agent compositions are fumarato chromium nitrates, although chlorides and other chromium fumarates are also desirable.

The invention also includes the treated pigments themselves and processes for making compositions of the invention.

DESCRIPTION OF THE PREFERRED EMBODIMENTS

The present invention is applicable to mineral-filled polyolefin molding resins in general. The resins of principal commercial importance are polyethylene and polypropylene, both in the stabilized condition and without antioxidant. An example of a useful stabilized polyethylene is a stiff, high density polyethylene having a density of 0.96 and a melt index of 17.5. The same polyethylene base resin without added antioxidant was also used in the tests reported below, and is identified simply as "Polyethylene." A suitable stabilized polypropylene is "Profax" 6623 produced by Hercules Company of Wilmington, Del., and a suitable polypropylene without antioxidants is Hercules Profax 6601. Profax 6623 has a density of 0.9 and a melt index of 1 to 3. Profax 6601 has a density of 0.9 and a melt index of 1 to 3. Other grades and types of polyethylene and polypropylene, as well as other polyolefins, are suitable for use with the present invention.

The polyolefin resin polymeric materials used in the invention are solid, preferably substantially crystalline (at least 25% and preferably at least 50% crystalline) polymers which contain a major proportion, meaning greater than 50% by weight, of an aliphatic olefin having from 2 to 8 carbon atoms. Such polyolefins include polyethylene, substantially crystalline polypropylene, ethylene propylene block or random copolymers, ethylene butene-1 block or random copolymers, polybutene-1, and the like. Also included herein in the meaning of the term polyolefin are copolymers of hydrocarbon monomers with polar monomers in which such monomers constitute a minor proportion of the copolymer, less than 50% by weight. Such monomers frequently used include acrylic monomers such as methyl methacrylate, ethyl acrylate and acrylonitrile, and vinyl esters such as vinyl acetate.

Although the theory is not readily susceptible to proof, and the present invention should not be limited by any particular theoretical mechanism, it appears that the coupling agents used in the invention operate by bonding a chromium atom of the chromium complex in some way to the silicon-oxygen bond in various particulate crystalline silicate minerals. Empirical evidence shows that the mechanism is not nearly as afffective with quartz and other silica or vitreous fillers as it is with the common silicate mineral fillers. Also, basic fillers such as $CaCO_3$ and ZnO would react with the acidic chromium complex coupling agents which generally have a pH of 1.5 to 3.0. The resulting damage to the chromium complexes makes such fillers unsuitable for use with the invention.

Silicate minerals which are useful in the present invention include the following:

| | |
|---|---|
| Talc | $3MgO \cdot 4SiO_2 \cdot H_2O$ |
| Montmorillonite | $(Al,Na,Mg)Si_4O_{10}(OH)_2$ |
| Kaolin | $Al_2O_3 \cdot SiO_2 \cdot 2H_2O$ |
| Calcined Kaolin | $Al_2O_3 \cdot 2SiO_2$ |
| Wollastonite | $CaSiO_3$ |
| Mica | $K_2O \cdot 3Al_2O_3 \cdot 6SiO_2 \cdot 2H_2O$ |
| Asbestos | |
|   Chrysotile (Serpentine) | $Mg_3Si_2O_5(OH)_4$ |
|   Tremolite | $Ca_2Mg_5Si_8O_{22}(OH)_2$ |
|   Crocidolyte | $Na_2O \cdot Fe_2O_3 \cdot 3FeO \cdot 8FeO_2 \cdot H_2O$ |
|   Hornblende | $Ca_2Na(Mg,Fe,Al)_5Al_2Si_6O_{22}(OH)_2$ |
| Attapulgite | $.5MgO \cdot SlO_2 \cdot 9H_2O$ |

Although these are the principal silicate mineral fillers used in polyolefin polymeric materials, and they are generally represented by the gross general formulae indicated, above, it will be understood by those skilled in the art that the present invention is applicable to other related silicate mineral fillers available in suitable particulate form, and that various refinements and variations on the formulae given are possible, all within the spirit and scope of the invention. Although these are naturally occuring minerals, some can be modified or synthesized. Commercial grades of these materials need not be absolutely pure. Various particle sizes and shapes can be found in these minerals. Asbestos and some forms of wollastonite are fibrous or acicular. It is recognized that fibrous materials often have a greater strengthening effect in a filled composite than non-fibrous particulate fillers. Clays and related materials, such as the kaolins and montmorillonite are economically attractive as fillers. Useful background on silicate mineral filler materials is available many places in the literature including particularly Grimshaw, "The Chemistry and Physics of Clays and Allied Ceramic Materials," 4th Ed., Revised 1971, Wiley-Interscience.

In the following discussions of the invention, the silicate minerals used were: ASP 400 calcined kaolin clay produced by Englehart Minerals and Chemicals Co. of Menlo Park, Edison, N.J.; "Platene" 725 talc produced by International Talc Co. of Gouveneur, N.Y.; "Cabolite" P-1 and F-1 wollastonite produced by Cabot Co. of Boston, Mass., P-1 being a more finely ground material mainly used as a filler for plastics, and F-1 being a coarser material mainly used in ceramics; and chrysotile asbestos which can be obtained from various sources.

Chromium complexes used in the present invention are described in the above-mentioned U.S. Pat. No. 3,787,326. That patent, and, to a large extent, also the above mentioned Belgium Pat. No. 765,137, both describe chromium complexes useful as the coupling agent in the present invention. Reference may be made to those sources for a more complete understanding of the chemistry of such chromium complexes.

A solution of Type I fumarato chromium nitrate for use as a coupling agent in the present invention can be prepared as follows: In a total volume of 210 ml. an aqueous solution made of 40.0 g. chromium (III) nitrate, $Cr(NO_3)_3 \cdot 9H_2O$, and 23.20 g. fumaric acid. The solution, initially at pH 2.3, was held 20 minutes at 100°C., then cooled to 24°C. The pH resulting from the initial reaction was 0.29. To this were added with stirring 22.0 ml. of a 0.998 normal solution of ammonium bicarbonate, $NH_4HCO_3$, raising the pH to 0.37. The solution was held at 100°C. again for 30 minutes, then cooled to 24°C., resulting in a pH of 0.29. To this were added 18.0 ml. of the 0.998 normal ammonium bicarbonate solution, raising the pH to 0.38. The solution was held again at 100°C. for 30 minutes, then cooled to 24°C., resulting in a pH of 0.37. To the solution were then added 10.0 ml. more of the 0.998 normal ammonium bicarbonate solution, raising the pH to 0.40. The solution was again held at 100°C. for 50 minutes, then cooled to 24°C., resulting in a pH of 0.29. This completed the heating phases. To the solution were then added 96.1 ml. of the 0.998 normal ammonium bicarbonate solution, raising the pH to 2.20 in order to stabilize the solution. The solution was chilled to 3°–5°C. and filtered to remove excess fumaric acid. It was diluted with 19 times its volume of water, then adjusted to pH 3.1 with ammonium bicarbonate solution.

The product was a deep blue solution giving the broad band light absorption spectrum in water characteristic of Type I material with absorption maxima at 5750 A and 4120 A and molar absorbances of 31.1 and 29.8, respectively, determined on a Cary Model 11 Spectrophotometer.

Type III fumarato chromium nitrate complex for use in the present invention was prepared as follows: Chromium nitrate nonahydrate (46.2 g., 0.116 moles) was dissolved in 38 g. of water. While stirring the solution, 10.9 g. (0.136 moles) of 50% aqueous sodium hydroxide were added, keeping the temperature below 40°C. by the use of external cooling. Some solids were observed in the solution at this point. The temperature was then raised to reflux (106°C.) and held there for 15 minutes. The precipitate dissolved and the solution turned green. Fumaric acid (6.7 g., 0.058 moles) was added and refluxing was continued for another 15 minutes. The solution was cooled to 25°C. and filtered to remove a small amount, less than 0.1 g., of insoluble matter. The resulting solution was blue and was found by analysis to contain 5.9% chromium. The pH of this solution was 0.06.

A sample of this solution which was diluted in water to 0.05 molar chromium exhibited a characteristic broad band light absorption spectrum with absorption maxima at 4100 A and 5700 A with molar absorbances of 25.3 and 25.7, respectively, characteristic of Type III material.

To demonstrate the invention, pigments of calcined kaolinite, wollastonite, and talc were treated with fumarato chromium nitrate complexes of various concentrations in water.

Table I below shows both the dilutions of the complex used and the concentration of the Type I or Type III fumarato chromium nitrate (FCN) complex residue on the filler pigments measured as the percent of chromium relative to the filler. Percentages and proportions herein are by weight except where indicated otherwise. Table I gives information useful in determining how to provide certain desired concentrations of chromium complexes on the filler particles.

The fillers were treated by mixing the powdered pigments with sufficient quantities of coupling agent solutions to give stirrable slurries, which were agitated for an hour at room temperature. This was done at a pH of about 2.5. The pH should be kept in the range of about 1.5 to 3.0 to maintain the effectiveness of the fumarato chromium nitrate complex. The treated pigments were collected on filters, and the wet filter cakes were weighed before and after drying in a vacuum oven at 60°C. overnight. The chromium contents of the dried pigments were determined by X-ray fluoresence analysis. Varying amounts of complex were applied to the pigments by changing the concentration of chromium in the solutions used, as shown in Table 1 below. Although certain chromium complexes will become chemisorbed on the filler pigment surfaces and will still leave a substantive effect after being rinsed off with water, Types I and III materials are best used without rinsing. They absorb onto the surfaces of the pigments to varying extents, depending upon the nature of the pigment and its surface, as illustrated by Table I.

TABLE I

| Pigments | Treatment of Pigments with FCN H₂O:FCN Dilution | | %Cr on Dry Solids | |
|---|---|---|---|---|
| | Type I | Type III | Type I | Type III |
| ASP-400 Clay | 6:1 | 72:1 | 0.15 | 0.11 |
| " | — | 7:1 | — | 0.28 |
| " | 0:1 | 2:1 | 0.44 | 0.95 |
| "Cabolite" F1 Wollastonite | 6:1 | 72:1 | 0.33 | 0.17 |
| " p1 | 6:1 | — | 0.25 | — |
| " P1 | 0:1 | — | 1.55 | — |
| "Platene" 725 Talc | 6:1 | 72:1 | 0.36 | 0.30 |
| " | 0:1 | — | 2.78 | — |

With the more porous, high-surface area pigments, the chromium contents as determined by analysis were higher than those calculated from the weight gained by the pigments after drying the solution. It should be noted that Type III solution had a relatively high solids content of 6% chromium equivalent prior to mixing with whatever water was mixed with it, relative to the 0.5% chromium content of Type I.

EXAMPLES

The treated pigments were blended into the polypropylene and polyethylene resins containing antioxidant and without antioxidant, at filler concentrations of 20% and in some instances at 40%. The blending was done in a twin-screw extruder. Two passes through the extruder were used to give uniform composites in pelleted form. All of the pelleted blends were injection molded to give tensile and flex modulus test bars on an Arburg 1.5 oz. injection molding machine. Temperatures of 200°–225°C. and 190°C. were employed for the polypropylene and polyethylene blends, respectively. With repeated melt fusion of polypropylene and polyethylene in the extrusion blending and injection molding of filled polymers, the question of the stability of the unstabilized polymers was raised. However, measurements of the melt index before and after successive melt fusions by extrusion blending showed that no significant lowering of molecular weight occurred due to degradation.

Select physical property tests were made on the resulting materials, and the data collected are summarized and reflected in Tables II, III and IV below for the different polyolefin base materials. PP and PP-S respectively indicate Profax 6601 unstabilized polypropylene and Profax 6623 stabilized polypropylene. PE and PE-S respectively indicate the above-described unstabilized Polyethylene and stabilized polyethylene. The tables show what amount of filler is used and the identity and amount of the fumarato chromium nitrate, if any. The amount is shown as weight percent chromium on the treated and dried pigment. In Table IV, two types of wollastonite are used. These are "Cabolite" F1, indicated by (1) in the table, and Cabolite P1 indicated by (2).

TABLE II

CALCINED KAOLIN FILLER

| Polymer | Filler % | Treatment FCN Type (% Cr) | Tensile psi | Elong % | FlexMod Mpsi | IZOD ft lbs/in | Heat Dist.°C. (264 psi) |
|---|---|---|---|---|---|---|---|
| PP | — | — | 5327 | 16 | 260 | 0.25 | 60 |
| " | 20 | — | 4180 | 18 | 288 | 0.31 | 66 |
| " | 20 | I(0.15) | 4970 | 8 | 383 | 0.32 | 76 |
| " | 20 | III(0.11) | 4940 | 15 | 384 | 0.30 | 74 |
| " | 20 | I(0.28) | 4940 | 17 | 391 | 0.26 | 69 |
| " | 20 | III(0.95) | 4790 | 12 | | | |
| " | 20 | I(0.44) | 4930 | 13 | | | |
| " | 40 | — | 3190 | 9 | 375 | 0.27 | 63 |
| " | 40 | I(0.13) | 4710 | | 550 | 0.36 | 75 |
| " | 40 | I(0.28) | 4600 | 5 | 556 | 0.33 | 75 |
| " | 40 | I(0.44) | 4790 | 5 | | | |
| " | 40 | III(0.95) | 4420 | 5 | | | |
| PP-S | — | — | 5160 | 240 | | | |
| " | 20 | — | 4420 | 11 | | | |
| " | 20 | I(0.15) | 4840 | 11 | | | |
| PE | — | — | 3900 | 350 | 215 | 0.98 | 55 |
| " | 20 | — | 3600 | 16 | 297 | 0.31 | 65 |
| " | 20 | I(0.15) | 3930 | 15 | 297 | 0.33 | 67 |
| " | 20 | III(0.11) | 3950 | 13 | 313 | 0.31 | 61 |
| PE-S | — | — | 4030 | 410 | | | |
| " | 20 | III(0.95) | 3810 | 15 | | | |
| " | 20 | I(0.44) | 3960 | 14 | | | |

TABLE III

TALC FILLER

| Polymer | Filler % | Treatment FCN Type (% Cr) | Tensile psi | Elong % | FlexMod Mpsi | IZOD ft lbs/in | Heat Dist.°C. (264 psi) |
|---|---|---|---|---|---|---|---|
| PP | — | — | 5327 | 16 | 260 | 0.25 | 60 |
| " | 20 | — | 5150 | 7 | | | |
| " | 20 | I(0.36) | 5510 | 9 | | | |
| " | 20 | III(0.30) | 5530 | 9 | | | |
| " | 20 | I(2.78) | 5220 | 11 | | | |
| " | 40 | — | 4850 | 6 | | | |
| " | 40 | I(2.78) | 5260 | 4 | | | |
| PP-S | — | — | 5160 | 240 | | | |
| " | 20 | — | 5130 | 8 | | | |
| " | 20 | I(0.36) | 5330 | 8 | | | |
| PE | — | — | 3900 | 350 | 215 | 0.98 | 55 |
| " | 20 | — | 4110 | 8 | | | |
| " | 20 | I(0.36) | 4330 | 10 | | | |
| " | 20 | III(0.30) | 4490 | 10 | | | |
| PE-S | — | — | 4030 | 410 | | | |
| " | 20 | — | 4200 | 7 | | | |
| " | 20 | III(0.30) | 4420 | 5 | | | |

TABLE IV

WOLLASTONITE FILLER

| Polymer | Filler (Type) | % | Treatment FCN Type (% Cr) | Tensile psi | Elong % | FlexMod Mpsi | IZOD ft lbs/in | Heat Dist.°C. (264 psi) |
|---|---|---|---|---|---|---|---|---|
| PP | — | | — | 5327 | 16 | 260 | 0.25 | 60 |
| " | (1) | 20 | — | 4680 | 13 | 405 | 0.30 | 76 |
| " | " | " | I(0.33) | 5050 | 14 | 413 | 0.32 | 76 |
| " | " | " | III(0.17) | 5340 | 10 | 429 | 0.31 | 78 |
| " | (2) | " | — | 4610 | 13 | | | |
| " | " | " | I(0.22) | 4960 | 12 | | | |
| " | " | " | I(1.55) | 4990 | 10 | | | |
| " | " | 40 | — | 4380 | 9 | 593 | 0.34 | 89 |
| " | " | " | I(0.72) | 4960 | 5 | 592 | 0.30 | 90 |
| " | " | " | I(1.55) | 5000 | 5 | | | |
| PP-S | — | | — | 5160 | 240 | | | |
| " | (1) | 20 | — | 4710 | 13 | | | |
| " | " | 20 | I(0.33) | 4650 | 13 | | | |
| PE | — | | — | 3900 | 350 | 215 | 0.98 | 55 |
| " | (1) | 20 | — | 3970 | 13 | | | |
| " | " | " | I(0.33) | 4140 | 10 | | | |
| " | " | " | III(0.17) | 3980 | 16 | | | |
| " | (2) | " | — | 3860 | 14 | | | |
| " | " | " | I(0.33) | 3930 | 10 | | | |
| " | " | 40 | — | 3860 | 4 | | | |
| " | " | " | I(0.33) | 3920 | 4 | | | |
| PE-S | (1) | 20 | — | 4280 | 11 | | | |
| " | " | 20 | I(0.33) | 4300 | 8 | | | |

Table V below analyses some of the data obtained to show the effect of different quantities of chromium on the various pigments in Profax 6601 polypropylene. Little is gained by having more than about 1.0% chromium on the pigment. A desireable range generally is about 0.1 to 1.0%, and a preferred range about 0.05 to 0.3%.

TABLE V

EFFECT OF FCN CONCENTRATION ON FILLED PP TREATMENT

| Pigment | %Filler in Polymer | FCN Type | %Cr on Filler | Dry Tensile psi |
|---|---|---|---|---|
| None | — | — | — | 5327 |
| Calcined Kaolin | 20 | — | — | 4180 |
| " | " | I | 0.15 | 4970 |
| " | " | III | 0.11 | 4940 |
| " | " | III | 0.28 | 4940 |
| " | " | I | 0.44 | 4930 |
| " | " | III | 0.95 | 4790 |
| " | 40 | — | — | 3190 |
| " | " | I,III | 0.13 | 4710 |
| " | " | III | 0.28 | 4600 |
| " | " | I | 0.44 | 4790 |
| " | " | III | 0.95 | 4420 |
| Wollastonite "Cabolite"P1 | 20 | — | — | 4680 |
| " | " | III | 0.17 | 5340 |
| " | " | I | 0.22 | 4960 |
| " | " | I | 0.33 | 5050 |
| " | " | I | 1.55 | 4990 |
| " | 40 | — | — | 4380 |
| " | " | I | 0.33 | 4960 |
| " | " | I | 1.55 | 5000 |
| Talc | 20 | — | — | 5150 |
| " | " | I | 0.36 | 5500 |
| " | " | III | 0.31 | 5530 |
| " | " | I | 2.78 | 5220 |
| " | 40 | — | — | 4850 |
| " | " | I | 2.78 | 5260 |

These data show that injection molded polypropylene without antioxidant filled with 20% calcined kaolin has 25% less tensile strength and slightly higher flex modulus and heat distortion temperature than the unmodified polymer. When the clay filler is treated with Type I or Type III material, the tensile strength is raised to almost that of the unmodified polymer, and the flex modulus and heat distortion temperature are improved significantly over composites containing untreated clay filler. Whereas a 40% drop in tensile strength results from filling this material with 40% calcined kaolin, the strength loss is minimized at only 5% by treating the filler with Type I material. Other properties are not affected adversely when Type I treated filler is used at the 40% level.

Treatment of wollastonite with Type I or Type III material permits the use of 40% filler in polypropylene which does not contain antioxidant without appreciable drop in tensile strength from that of the unfilled composite or the composite containing 20% wollastonite. Flex modulus and heat distortion values obtained with Type I treated wollastonite fillers in such polymers were even higher than those of the calcined kaolin-filled composites at comparable loadings.

In effect, actual reinforcement occurred in the case of Profax 6601 polypropylene filled with 20% of Type I treated talc, with a tensile strength 4% higher than that of the unfilled resin.

The magnitude of improved physical properties resulting from the use of coupling agents of the invention was greater for polypropylene than for polyethylene. Although maximum benefits were obtained from the use of treated fillers in unstabilized forms of polypropylene and polyethylene, similar improvements of slightly less degree were achieved with identical resins containing some antioxidants.

Tests performed with asbestos fibers treated with Type I showed considerable improvement in the extrudibility of the composite materials and in injection molding. When tested in stabilized polyethylene, a 30% loading of short fiber asbestos, Union Carbide Grade RG 144 asbestos fiber treated with Type I had a considerable higher flex strength than did the composite made with asbestos which had not been treated with the Type I materials. Also, similar Union Carbide Grade RG 244 asbestos fiber which is treated with a silane gave lower tensile strength and dry flex strength. Table VI below provides data on the dry and wet flex strength and Young's modulus in thousands of Psi and the percent retention of strength from the dry to the wet condition, as well as tensile strength and elongation in percent for the materials produced under the different conditions.

TABLE VI

| Treatment | Asbestos Filled Stabilized Polyethylene | | | | | |
|---|---|---|---|---|---|---|
| | Flex Strength | | | | Tensile | |
| | psi Dry | psi Wet | % Retention | Strength psi | Elong. % | Mod. Mpsi |
| None | 7800 | 7200 | 99 | 4400 | 6.3 | |
| | | | | 4470 | 2.6 | 790 |
| Type I | 9240 | 8450 | 92 | 4800 | 3.2 | |
| | | | | 4890 | 1.3 | 796 |
| Silane A 1100 | 8820 | 8600 | 98 | 4600 | 5.0 | |
| | | | | 4680 | 2.4 | 783 |

The data given in the several tables above illustrate the effectiveness of the invention with mineral silicate filled polyolefin resins using chromium complex coupling agents according to the invention.

What is claimed is:

1. A treated filler pigment selected from the group consisting of talc, kaolin, calcined kaolin, wollastonite, mica, attapulgite, asbestos and montmorillonite, said filler having absorbed on the surface thereof about in the range 0.01 to 1.0% based on the pigment weight of a coupling agent comprising one or more water-soluble coordination complexes of (a) chromium (III) derived from a water-soluble nitrate thereof, which nitrate yields $Cr(H_2O)_6^{3+}$ in water; with (b) a trans-acid of the formula

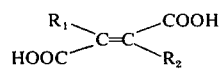

wherein $R_1$ and $R_2$ are the same or different and are H, alkyl, $-CH_2COOH$ or phenyl; provided that the total number of carbon atoms in said trans-acid is an integer in the range 4–10, inclusive.

2. A treated filler pigment according to claim 1 wherein the pigment is talc and the coupling agent is a fumarato chromium nitrate.

3. A treated filler pigment according to claim 1 wherein the pigment is kaolin and the coupling agent is a fumarato chromium nitrate.

4. A treated filler pigment according to claim 1 wherein the coupling agent is a composition, aqueous solutions of which have a purple blue color and give a characteristic broad band light absorption spectrum having maxima at about 5750 A and 4120 A.

5. A treated filler pigment according to claim 1 wherein the coupling agent is a composition, aqueous solutions of which have a blue color and give a characteristic broad band light absorption spectrum having maxima at about 5700 A and 4100 A.

6. A treated filler pigment according to claim 1 wherein the concentration of coupling agent absorbed on the pigment is about in the range of 0.01 to 1.0% based on the pigment weight.

7. A treated filler pigment according to claim 1 wherein the concentration of coupling agent absorbed on the pigment is about in the range of 0.05 to 0.3% based on the pigment weight.

* * * * *